United States Patent
Yoshida

[11] Patent Number: 5,769,452
[45] Date of Patent: Jun. 23, 1998

[54] VEHICLE OCCUPANT PROTECTIVE AIR BAG SYSTEM

[75] Inventor: Ryoichi Yoshida, Shiga, Japan

[73] Assignee: Takata Corporation, Tokyo, Japan

[21] Appl. No.: 826,821

[22] Filed: Apr. 8, 1997

[30] Foreign Application Priority Data

May 15, 1996 [JP] Japan ..................... 8-120380

[51] Int. Cl.⁶ ............... B60R 21/26; B60R 21/32
[52] U.S. Cl. ................. 280/735; 280/736; 280/742
[58] Field of Search ............... 280/739, 742, 280/735, 736, 741, 728.1

[56] References Cited

U.S. PATENT DOCUMENTS

| | | | |
|---|---|---|---|
| 4,213,635 | 7/1980 | Inokuchi et al. | 280/742 |
| 5,197,759 | 3/1993 | Kroiss et al. | 280/736 |
| 5,439,249 | 8/1995 | Steffens, Jr. et al. | 280/735 |
| 5,454,591 | 10/1995 | Mazur et al. | 280/735 |

FOREIGN PATENT DOCUMENTS

| | | | |
|---|---|---|---|
| 2339618 | 2/1974 | Germany | 280/742 |
| 2-147357 | 12/1990 | Japan . | |
| 6-1012 | 1/1994 | Japan . | |
| 6-156179 | 6/1994 | Japan | 280/736 |

*Primary Examiner*—Paul N. Dickson
*Attorney, Agent, or Firm*—Foley & Lardner

[57] ABSTRACT

A vehicle occupant protective air bag system that first deploys an air bag at a vehicle collision regardless of the presence or absence of an occupant near an air bag device, and subsequently decreases or stops gas flow into the air bag when there is a vehicle occupant near the air bag device. The air bag device has a gas pressure sensor to detect gas pressure inside an air bag. When detection signals from the sensor and an acceleration sensor are transmitted to the control unit indicating a vehicle collision, a controller of the control unit actuates a first of two inflators. If a detector determines that a vehicle occupant is near the air bag device, a second inflator of the two inflators is not actuated. If the detection detects that there is no occupant near the air bag device, the second inflator of the two inflators is actuated.

24 Claims, 1 Drawing Sheet

VEHICLE OCCUPANT PROTECTIVE AIR BAG SYSTEM

BACKGROUND OF THE INVENTION

The present invention relates to a vehicle occupant protective air bag system for protecting a vehicle occupant by deploying an air bag during a vehicle collision. More particularly, the present invention relates to a vehicle occupant protective air bag system capable of controlling the quantity of gas expelled from a gas generator relative to the impact strength of a vehicle collision.

As well known, a vehicle air bag device typically comprises a folded air bag, a casing or housing in which the air bag is accommodated, and a gas generating means for deploying the air bag. When an impact detecting sensor installed in the vehicle outputs an impact detection signal, the gas generating means is actuated to generate gas whereby the air bag is deployed widely in front of the vehicle occupant.

For the gas generating means, an inflator comprising propellant and an ignitor for igniting the propellant has been generally used.

An air bag device generally used is provided with one or two inflators. In case of the air bag with two inflator, the two inflator are generally designed to be simultaneously actuated corresponding to the impact detection signal.

Air bag devices, however, having two inflators or a dual-stage inflator that are actuated with a time difference are disclosed in Japanese Laid-open Patent Nos. 2-310143/1990 (European Patent No. 399498 A), 4-345555/1992, 4-345556/1992, 7-47910/1995, and British Patent No. 2281429 A. In such an air bag device, even with a time difference, all of the inflators are actuated when an impact is detected. Thus, the operation of these two or dual-stage inflator air bag devices is the same as the conventional air bag device that includes a single or one-stage inflator.

Air bag devices have been provided that completely disengage if the vehicle occupant is not within a proper sitting position. For example, Japanese Laid-open Utility Model No. 2-147357/1990 discloses a system which does not actuate an air bag device for a passenger seat when a child stands in front of the passenger seat. U.S. Pat. No. 5,554,591 discloses that an air bag device for a passenger seat is not actuated when a child seat is not properly secured. Accordingly, these systems provide no air bag protection during a vehicle collision.

Alternatively, air bag systems have been provided that inform the driver that the passenger seat occupant is not in a position appropriate for air bag deployment. For example, Japanese Laid-open Utility Model No. H6-1012/1994 discloses an air bag system which alarms when an occupant in a passenger seat is in an out-of-position location (i.e., not sitting properly on the passenger seat).

Moreover, air bag devices have been provided that determine the quantity of gas introduced into the air bag based on the vehicle occupant position. U.S. Pat. No. 5,439,249 discloses an air bag device provided with a detection sensor for detecting the position of an occupant in a passenger seat, and a relief valve for releasing a part of the gas, introduced into an air bag from an inflator, to the outside of the air bag. The relief valve is opened when a vehicle comes into collision and the inflator is therefore actuated. The valve travel of the relief valve is defined according to the position of the vehicle occupant in the passenger seat.

Although various air bag devices have been provided in the past, each of the air bag devices is limited in the manner in which the quantity of gas introduced into the air bag is controlled and fails to provide a system that adjusts the quantity of gas introduced into the air bag based on the vehicle occupant position and vehicle collision strength.

SUMMARY OF THE INVENTION

It is an object of the present invention to provide a vehicle occupant protective air bag system which first deploys an air bag at a vehicle collision regardless of the presence or absence of an occupant in an out-of-position location near an air bag device, and then decreases or stops the gas flow rate into the air bag if the vehicle occupant is in an out-of-position location near the air bag device.

This objective is achieved in accordance with the present invention by providing a vehicle occupant protective air bag system with an air bag device, a detector, and a controller. The air bag device has an air bag, a housing that accommodates the air bag, and a gas generator that generates and supplies gas into the air bag. The detector determines whether a vehicle occupant is in an out-of-position location based an inner gas pressure of the air bag during inflation. The controller detects a vehicle impact, actuates the gas generator, and decreases the supply of the gas from the gas generator into the air bag during gas generation when the vehicle occupant is in the out-of-position location.

The detector includes a gas pressure detector, a memory, and a judging device. The gas pressure detector, which is preferably a gas pressure sensor, detects an inner pressure in the air bag after actuation of the gas generator. The memory stores as a reference inner pressures elapsed pressure changes in the inner pressure detected by the gas pressure detector when the air bag deploys freely with a vehicle occupant located in a proper-position. The judging device determines the presence of a vehicle occupant in the out-of-position location when elapsed pressure changes of the actual inner pressures detected by the gas pressure detector during deployment of the air bag are different from the reference inner pressures.

The objective of the invention may also be achieved by providing in accordance with the present invention a vehicle occupant protective air bag system with an air bag device having an air bag in the folded state, a housing accommodating the air bag, a gas generator which supplies gas into the air bag to deploy the air bag, and a controller that detects a vehicle impact and actuates the gas generator. The gas generator is configured to decrease or stop the supply of gas into the air bag during gas generation. The vehicle occupant protective air bag system can further comprise a detector which detects whether a vehicle occupant is in an out-of-position location. Upon detection by the detector that the vehicle occupant is in the out-of-position location, the controller can decrease or stop the supply of gas into the air bag from the gas generator.

The gas generator of the vehicle occupant protective air bag can be provided with a plurality of inflators, preferably two. In this case, the controller may actuate a first inflator when a vehicle impact, e.g., collision impact, is detected, and then the controller may actuate a second inflator upon detection by the detector that the vehicle occupant is in a proper-position. That is, for example, a proper-position is when the vehicle occupant is seated on the vehicle seat.

Alternatively, the controller may place the second inflator in a non-operating state upon detection by the detector that the vehicle occupant is in the out-of-position location. The vehicle occupant can be considered to be in an out-of-position location when the vehicle occupant is not properly seated, is standing on or adjacent the seat, or is positioned near the air bag device, i.e., a near-position. The near-position would include, for example, a vehicle occupant location wherein the vehicle occupant is standing up or leaning forward so that the vehicle occupant is approximate the air bag device.

The vehicle occupant protective air bag system of the present invention can further comprise a gas pressure detector, preferably a gas pressure sensor within the air bag, which detects that the vehicle occupant is in the near-position approximate the air bag device. In this case, a detector uses its judging device to determine whether the vehicle occupant is in the near-position approximate the air bag device when the gas pressure detected by the gas pressure detector is higher than a predetermined value after starting the actuation of the gas generator. The judging device determines whether the vehicle occupant is in the near-position approximate the air bag device based on the gas pressure in the air bag after the gas pressure reaches its maximum at a first time after starting the actuation of the gas generator. In addition, the judging device can compare the gas pressure after a predetermined time period from the first time when the gas pressure reaches its maximum with a maximum gas pressure, and then the judging device detects that the vehicle occupant is in the near-position approximate the air bag device when the difference between the two pressures is less than a predetermined value.

The vehicle occupant protective air bag system according to the present invention may include (1) a gas pressure detector which can detect that a vehicle occupant is in a position near the air bag device, by detecting a gas pressure in the air bag after starting the actuation of the gas generator, (2) a memory which stores electronic data concerning elapsed changes in the gas pressure detected by the gas pressure detector when there is no vehicle occupant near the air bag so that the air bag deploys freely, and (3) a judging device which can judge that there is a vehicle occupant near the air bag device when the elapsed changes in the actual inner pressure detected by the gas pressure detector are different from the elapsed inner pressure changes in case of free deployment.

The object of the invention is also achieved by providing a method of protecting a vehicle occupant in accordance with the invention. This method includes actuating a gas generator to supply gas to an air bag; determining whether a vehicle occupant is in an out-of-position location based on an inner pressure of the air bag; and decreasing the supply of the gas into the air bag from the gas generator during gas generation when the vehicle occupant is in the out-of-position location.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
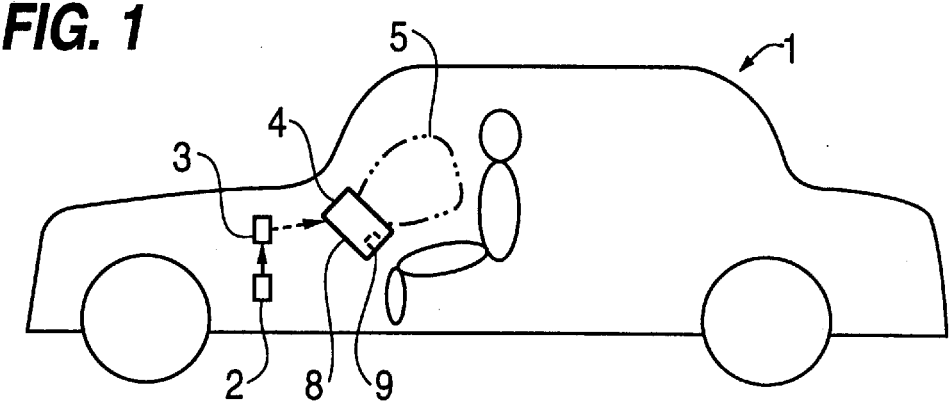
FIG. 1 is a side view of a vehicle in which a vehicle occupant protective air bag system according to an embodiment of the present invention is installed.

The air bag of the vehicle occupant protective air bag system of the present invention can be partially deployed during a vehicle collision so that the vehicle occupant can be protected even when the vehicle occupant plunges into the inflating air bag. When this event occurs, the protective system determines whether the vehicle occupant is in an out-of-position location. When the vehicle occupant is in the out-of-position location, air bag deployment is stopped or limited. Therefore, even when a vehicle occupant is in an out-of-position location in a near-position approximate the air bag device, the air bag does not significantly impact on the vehicle occupant.

When the vehicle occupant is in a proper-position location, i.e., the vehicle occupant sits in a proper position on a vehicle seat, the air bag can be continuously deployed. Under these conditions, the air bag is deployed without limitation by the vehicle occupant or an object in the vehicle cabin. It should be noted that such a deployment without limitation will be referred to as the "free deployment".

In a preferred embodiment of the invention, the protective system includes a gas generator having a plurality of inflators. Consequently, when a vehicle occupant is determined to be in an out-of-position location, no additional inflator can be actuated after the actuation of a first inflator. Therefore, further gas flow into the air bag can be securely stopped.

Alternatively, when an occupant is in the out-of-position location near the air bag device, the gas flow into the air bag can be decreased or stopped so that the air bag does not significantly impact on the vehicle occupant. When the vehicle occupant is near the air bag device and the vehicle occupant collides with the deploying air bag, the inner pressure of the air bag may become higher than the inner pressure of an air bag when the vehicle occupant does not contact the deploying air bag and the air bag is allowed free deployment. Therefore, the vehicle occupant protective system of the present invention can determine whether there is an vehicle occupant near the air bag device based on the inner pressure of the air bag.

In the vehicle occupant protective air bag system, when the air bag is about to develop by gas pressure from the gas generator (inflator) after actuation of the inflator, the air bag pushes outward on the casing or the housing that accommodates the air bag, and thus opens the housing. Then, the air bag starts to develop into a vehicle cabin. The inner pressure of the air bag reaches a maximum at the moment the air bag opens the housing. Once the housing is opened by the air bag, the inner pressure of the air bag decreases because the air bag develops or deploys into the vehicle cabin. At this point, when there is no occupant near the air bag device (i.e., the vehicle occupant is in a proper-position location or no object is present to obstruct inflation of the air bag), the air bag can develop quickly into the vehicle cabin without limitation. That is, the air bag undergoes free deployment, and, thus, the inner pressure of the air bag decreases rapidly after opening the housing.

When the vehicle occupant is in the out-of-position location near the air bag device, the development of the air bag after opening the housing is obstructed by the vehicle occupant so that the development speed of the air bag is lowered. The lower development speed of the air bag slows down the rate at which the inner pressure of the air bag declines. Therefore, the vehicle occupant protective air bag system of the present invention may, then, determine whether there is a vehicle occupant in an out-of-position location near the air bag device based on the inner pressure of the air bag after opening the housing. Although the determination or judgment may be made based on the value of the inner pressure, the determination can be more readily made based on the decline rate in the inner pressure of the air bag from the maximum value after the air bag opens the housing.

Thus, determinations as to whether there is a vehicle occupant near an air bag device can be accomplished by comparing the elapsed variation of the inner pressure in case of free deployment of the air bag with the elapsed variation of the inner pressure during the subject deployment of the air bag.

Figure 2:
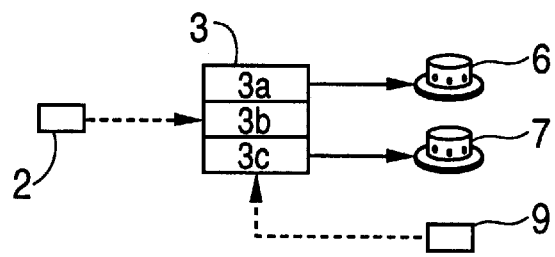
FIG. 2 is a system diagram of the vehicle occupant protective air bag system according to the embodiment of the invention shown in FIG. 1.

Referring to FIGS. 1–3, a preferred embodiment of the present invention will be described. In order to ensure that the description of the present invention is complete, however, the priority document for this application is hereby expressly incorporated by reference in its entirety. That is, Japanese application 8-120,380 filed May 15, 1996 is hereby incorporated by reference.

A vehicle 1 is provided with an acceleration sensor 2, a control unit 3, an air bag device 4, and a gas pressure detector (sensor) 9. The control unit 3 includes a controller 3a, a memory 3b that serves as a storing means, and a judging device 3c. The air bag device 4 may be either for a passenger seat or a rear seat.

The vehicle occupant protection system of the present invention includes a detector that determines whether a vehicle occupant is in an out-of-position location based an inner gas pressure of the air bag during inflation. The detector, preferably, includes the gas pressure detector (sensor) 9, the memory 3b, and the judging device 3c.

The air bag device 4 is designed to deploy an air bag 5 accommodated in a casing or housing 8 by a gas generator including a first and a second inflator 6 and 7. Although two inflators 6 and 7 are employed in the preferred embodiment, three or more inflators may be used. Preferably, at least one of the inflators will be capable of decreasing or stopping gas evolution or generation during operation. Likewise, each inflator that is capable of decreasing or stopping its gas supply will be capable preferably of releasing to an area outside the air bag or air bag device the gas supplied to the air bag when the air bag is being deployed.

The air bag device 4 has a gas pressure sensor 9 to detect the gas pressure within the air bag 5. The gas pressure sensor 9 may be placed in various locations, however, the sensor 9 must be positioned so it can determine the gas pressure within the air bag 5. For example, sensor 9 maybe located within the air bag 5 or approximate the air bag 5, as shown in FIG. 1.

Detection signals generated from the gas pressure sensor 9 and the acceleration sensor 2 are transmitted to the control unit 3. The control unit 3 is designed to supply electric current from a battery (not shown) to ignitors (not shown) of the inflators 6 and 7 to activate the inflators 6 and 7.

When the vehicle 1 collides with another vehicle or an object, the vehicle's acceleration or deceleration is detected by the acceleration sensor 2. Upon receiving the appropriate detection signal from the acceleration sensor 2 that the detected value is greater than a predetermined threshold, the controller 3a of the control unit 3 actuates a first of the two inflators (e.g., inflator 6) to deploy the air bag 5.

Figure 3A:
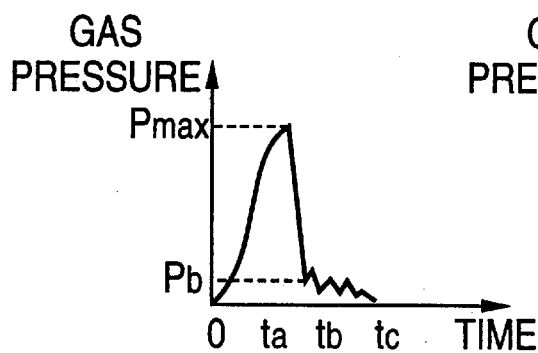
FIGS. 3A and 3B are graphical representations of the elapsed changes in the inner pressure of the air bag, illustrating the operation of the vehicle occupant protective air bag system according to the embodiment of the invention shown in FIG. 1.

Upon actuation of the inflator 6, the air bag 5 forces outward on the housing 8, and thus opens a part of the housing 8. Then, the air bag 5 starts to develop into the vehicle cabin. At this point, when there is no vehicle occupant in an out-of-position location near the air bag device 4 (i.e., the vehicle occupant is in a proper-position location or no object is present to obstruct inflation of the air bag), the air bag 5 can develop quickly into the vehicle cabin without limitation. That is, the air bag undergoes free deployment, and the inner pressure of the air bag 5 decreases rapidly after reaching a maximum inner pressure ($P_{max}$) as shown in FIG. 3A. As stated before, the inner pressure of the air bag 5 reaches its maximum at the moment the air bag 5 opens the housing 8.

When the vehicle occupant is in the out-of-position location near the air bag device 4, the development of the air bag 5, after opening of the housing 8, is obstructed by the vehicle occupant so that the development speed of the air bag is lowered. The lower development speed of the air bag slows down the rate at which the inner pressure of the air bag declines after the inner pressure of the air bag reaches its maximum.

Detection signals from the gas pressure sensor 9 indicating the inner pressure of the air bag are transmitted to the judging device 3c of the detector. With the detection signal, the detector can determine whether there is a vehicle occupant in an out-of-position location near the air bag device or not. This determination is made from the inner gas pressure of the air bag after the air bag 5 reaches the maximum inner pressure.

In order to accomplish this determination, the air bag inner pressure $P_b$ recorded at the time $t_b$, $\Delta t$ seconds after the time $t_a$ when the inner pressure reaches the actual maximum inner pressure is compared with the maximum inner pressure $P_{max}$. In other words, $P_b$ becomes a determinative inner pressure, and is compared with the maximum inner pressure $P_{max}$. The detector determines that there is no vehicle occupant in an out-of-position location near the air bag device when ($P_{max}-P_b$) is equal to or less than f % (e.g., 50%) of $P_{max}$. The value of f is already inputted in the memory 3b of the control unit 3. It should be understood that the value of f may be other than 50%.

The reason to compare $P_{max}$ with ($P_{max}-P_b$) is that it is easier to judge the existence of a vehicle occupant near the air bag device by this method than judging from the value of the air bag inner pressure $P_b$ itself at the time $t_b$, because the value of $P_{max}$ differs depending on the types of inflator and volume of bags. The existence of a vehicle occupant near the air bag device, however, may be judged by the value of the determinative inner pressure $P_b$ itself in the present invention.

Preferably, the inner pressures shown by the curve in FIG. 3A correspond to the elapsed pressure changes within the air bag in the case of free deployment. These inner pressures become reference inner pressures for the protective system. Thus, the curve shown in FIG. 3A is stored in the memory 3b of control unit 3 and compared with a curve of elapsed pressure change of the actual inner pressures of the air bag 5 detected during the deployment of the air bag 5 to determine whether a vehicle occupant is in an out-of-position location, i.e., near the air bag device.

A judging device 3c of the detector determines that there is no vehicle occupant near the air bag device when the fluctuation of the gas pressure of the deploying air bag is the same as the fluctuation of the reference gas pressures stored in the curve shown in FIG. 3A. Otherwise, the judging device 3c determines that there is an occupant near the air bag device. That is, when the fluctuation of the gas pressure within the deploying air bag 5 is different from the fluctuation of the reference gas pressures stored in the curve shown in FIG. 3A, the judging device 3c determines that the vehicle occupant is in the out-of-position location.

When the judging device 3c of the detector determines that there is no occupant near the air bag device 4 because the inner pressures within the deploying air bag 5 correspond to the reference inner pressures following the curve shown in FIG. 3A, the controller 3a of the control unit 3 actuates the second of the two inflators (e.g., inflator 7), $t_c$ seconds after the actuation of the first of the two inflators (inflator 6), thereby causing the air bag 5 to further deploy into the vehicle cabin.

Figure 3B:
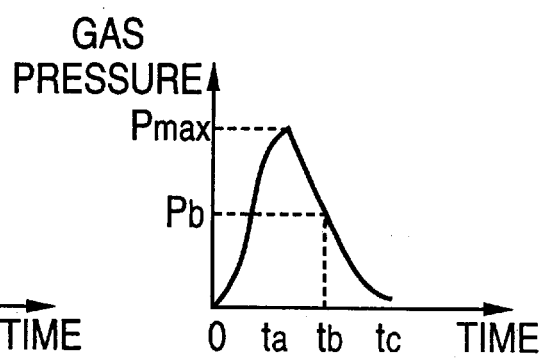

When the judging device 3c determines that there is a vehicle occupant in an out-of-position location near the air bag device 4, the inner pressures within the deploying air bag 5 follow a curve such as that shown in FIG. 3B, and the controller 3a of the control unit 3 does not activate the second inflator 7. Because the second inflator 7 is not activated, the air bag 5 deploys softly into the vehicle cabin. That is, the inner pressure of the deploying air bag 5 is lower than the condition when both inflators 6 and 7 are actuated. Thus, the vehicle occupant near the air bag device 4 is impacted softly by the air bag 5.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A vehicle occupant protective air bag system comprising:
   an air bag device having an air bag, a housing that accommodates the air bag, and a gas generator that generates and supplies gas into the air bag;
   a detector that determines whether a vehicle occupant is in an out-of-position location based on an inner gas pressure of the air bag during inflation; and
   a controller that responds to a vehicle impact, actuates the gas generator, and decreases the supply of the gas from the gas generator into the air bag during gas generation when the vehicle occupant is in the out-of-position location.

2. The vehicle occupant protective air bag system recited in claim 1, wherein the controller decreases the supply of gas so that the supply of gas stops.

3. The vehicle occupant protective air bag system recited in claim 1, wherein the air bag is in a folded state prior to gas generation by the gas generator.

4. The vehicle occupant protective air bag system recited in claim 1, wherein said gas generator comprises at least a first inflator and a second inflator; and
   wherein the controller actuates the first inflator when the vehicle impact is detected, and subsequently actuates the second inflator only if the vehicle occupant is located in a proper-position, and otherwise leaves the second inflator in a non-operating state.

5. The vehicle occupant protective air bag system recited in claim 1, wherein the detector comprises a gas pressure sensor that determines an inner pressure in the air bag after the gas generator supplies the gas to the air bag.

6. The vehicle occupant protective air bag system recited in claim 5, wherein the gas pressure sensor is located within the air bag.

7. The vehicle occupant protective air bag system recited in claim 5, wherein the out-of-position location includes a near-position when the vehicle occupant is approximate the air bag device.

8. The vehicle occupant protective air bag system recited in claim 7, wherein the detector judges whether the vehicle occupant is in the near-position.

9. The vehicle occupant protective air bag system recited in claim 8, wherein the detector judges whether the vehicle occupant is in the near-position by evaluating the inner pressure determined by the gas pressure sensor.

10. The vehicle occupant protective air bag system recited in claim 9, wherein the detector judges that the vehicle occupant is in the near-position when the inner gas pressure is greater than a predetermined value.

11. The vehicle occupant protective air bag system recited in claim 10, wherein the detector judges after the inner pressure reaches a maximum inner pressure at a first time after actuation of the gas generator.

12. The vehicle occupant protective air bag system recited in claim 11, wherein the detector judges by comparing the difference between a determinative inner pressure with the maximum inner pressure.

13. The vehicle occupant protective air bag system recited in claim 12, wherein the determinative inner pressure is stored after a predetermined time period from the first time.

14. The vehicle occupant protective air bag system recited in claim 12, wherein the detector judges that the vehicle occupant is in the near-position when the difference between the determinative inner pressure and the maximum inner pressure is less than a predetermined value.

15. The vehicle occupant protective air bag system recited in claim 14, wherein the predetermined value comprises a ratio of the maximum inner pressure.

16. The vehicle occupant protective air bag system recited in claim 15, wherein the ratio comprises 50%.

17. The vehicle occupant protective air bag system recited in claim 1, wherein said detector comprises:
   a gas pressure detector that detects an inner pressure within the air bag after actuation of the gas generator;
   a memory that stores as reference inner pressures elapsed pressure changes in the inner pressure within the air bag detected by the gas pressure detector when the air bag deploys freely with a vehicle occupant located in a proper-position; and
   a judging device that determines the presence of the vehicle occupant in the out-of-position location when elapsed pressure changes of the actual inner pressures detected by the gas pressure detector during deployment of the air bag are different from the reference inner pressures.

18. The vehicle occupant protective air bag system recited in claim 1, wherein said detector comprises:
   a gas pressure detector that determines an inner pressure in the air bag after actuation of the gas generator; and
   a judging device that determines the presence of the vehicle occupant located in the out-of position location from the inner pressure determined from the gas pressure detector.

19. The vehicle occupant protective air bag system recited in claim 18, wherein the judging device determines that the vehicle occupant is in the out-of-position location at a near-position adjacent the air bag device when the inner pressure of the air bag is greater than a predetermined value.

20. The vehicle occupant protective air bag system recited in claim 19, wherein the judging device determines that the vehicle occupant is in the near-position when the difference between the inner gas pressure after a predetermined period from a first time inner pressure reached its maximum inner pressure and a reference maximum inner pressure is less than a predetermined ratio.

21. A method of protecting a vehicle occupant, comprising:

actuating a gas generator to supply gas to an air bag;

determining whether the vehicle occupant is in an out-of-position location based on an inner pressure of the air bag; and decreasing the supply of the gas into the air bag from the gas generator during gas generation when the vehicle occupant is in the out-of-position location.

22. The method of protecting a vehicle occupant recited in claim 21, wherein the decreasing step includes controlling the supply of gas with a controller so that the supply of gas stops.

23. The method of protecting a vehicle occupant recited in claim 21, wherein the determining step includes providing a detector comprising:

a gas pressure sensor that determines the inner pressure within the air bag after actuation of the gas generator; and a judging device that determines the presence of the vehicle occupant located in the out-of position location from the inner pressure determined from the gas pressure sensor.

24. The method of protecting a vehicle occupant recited in claim 23, wherein the judging device determines that the vehicle occupant is in the out-of-position location at a near-position adjacent the air bag device when the inner gas pressure of the air bag is greater than a predetermined value.

* * * * *